Patented July 22, 1924.

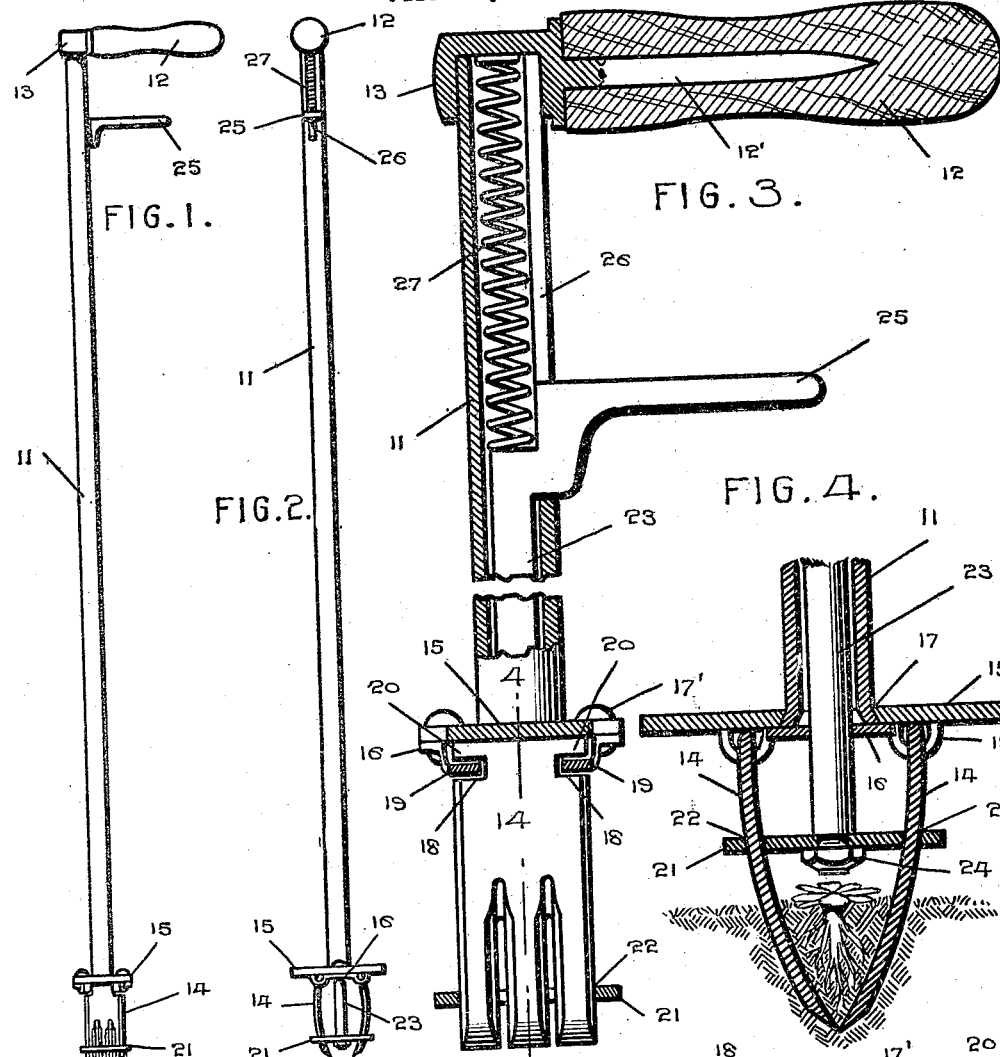

1,501,965

UNITED STATES PATENT OFFICE.

WALTER C. MOORS, OF OWENSBORO, KENTUCKY.

WEED EXTRACTOR.

Application filed September 10, 1923. Serial No. 661,858.

*To all whom it may concern:*

Be it known that I, WALTER C. MOORS, a citizen of the United States, residing at Owensboro, in the county of Daviess and State of Kentucky, have invented certain new and useful Improvements in Weed Extractors, of which the following is a specification, reference being had therein to the accompanying drawing.

The present invention relates to devices for extracting or pulling weeds from the ground, and aims to provide a novel and improved device of that kind which can be conveniently manipulated for effectively catching hold of and pulling the weeds from the soil.

Another object is the provision of such a device comprising a novel construction and assemblage of the component elements, to enhance the utility and efficiency of the implement, and to render it substantial and durable.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a side elevation of the device.

Fig. 2 is another side elevation looking at right angles to the line of view in Fig .1.

Fig. 3 is an enlarged detail view of the device, looking in the same direction as in Fig. 1, portions being shown in elevation and portions in section.

Fig 4 is a section on the line 4—4 of Fig. 3 showing the jaws closed.

Fig. 5 is an edge elevation of the parts seen in Fig. 4 showing the jaws open.

Fig. 6 is a section on the line 6—6 of Fig 5.

A tubular stem or shank 11 of suitable length has a laterally extending handle 12 at its upper end, and, as shown, the handle is of wood and is fitted and secured on a prong or tang 12′ extending to one side of the shank from a cap 13 fitted and secured on the upper end of the shank. Said handle enables the implement to be conveniently manipulated. A pair of jaws 14 is carried by the lower end portion of the shank, and, as shown, said jaws are in the form of forks or claws having prongs to enter the ground and to firmly hold a weed and its roots between the jaws when they are closed on the weed, as seen in Fig. 4. The lower ends and edges of the prongs are preferably sharpened so as to cut into the ground easily. Said jaws 14 are hingedly connected to the lower end of the shank in a substantial manner, as will presently appear.

Superposed plates 15 and 16 are secured to the lower terminal of the shank, the upper plate 15 being thicker than the lower plate 16 and being stiff and rigid. The lower terminal of the shank 11 is expanded or swaged in a central countersunk opening of the plate 15, as at 17, and the plate 16, which is thinner than the plate 15, is riveted, as at 17′, or otherwise secured to the plate 15 across the end of the shank 11, thereby securing the end of said shank to and between the plates. The rivets 17′ are located at opposite sides of the shank 11. The upper ends of the jaws 14 abut the plate 15 beyond opposite edges of the plate 16, and said jaws are provided at their side edges adjacent to their upper ends with the notches 18 in which are engaged the curved fingers 19 projecting from the opposite edges of the plate 16. Said fingers 19 are bent away from the plate 15 with their ends abutting said plate, and said fingers form hinge bearings for the jaws, the notches 18 of the jaws providing hinge studs or trunnions 20 mounted for turning movement between the fingers 19 and plate 15. The jaws are engaged with the fingers 19 before the plates 15 and 16 are secured together, thereby providing a strong and rugged construction which will be capable of withstanding wear and tear under the strains to which the device is subjected and rough treatment. The hinge connections are made by the engagement of the jaws between the plates 15 and 16, without using hinge pins, and when the jaws are forced into the ground, the strain between the shank and jaws is taken up by the stiff plate 15 against which the jaws abut.

The operating means for moving the jaws toward and away from one another to closed and open positions, comprises a plate 21 disposed below and parallel with the plates 15 and 16, and having parallel slots 22 at opposite sides of the axis of the shank 11 through which the jaws 14 extend. The slots 22 are spaced apart about the same distance as the hinge connections, and the jaws are curved, so that when the plate 21 is raised toward the shank, the jaws are swung toward one another, as seen in Fig. 4, whereas when the plate 21 is moved away from the end of the shank, the jaws 14 are separated, as seen in Fig. 5. The plate 21 is secured centrally on the lower terminal of a rod 23, by means of a nut 24 threaded on the end of the rod, and said rod extends longitudinally within the shank and has a laterally extending handle portion 25 at its upper end below the handle 12. The upper end portion of the shank 11 has a longitudinal slot 26 through which the handle portion 25 projects, and the rod 23 slides through the plate 16. The rod 23 is normally slid downwardly, to open the jaws 14, by means of a coiled spring 27 located within the upper end portion of the shank and confined between the upper end of the rod 23 and the cap 13.

In using the device, the jaws 14 are normally in open position, and the handle 12 is grasped by one hand. The jaws may then be forced or thrust into the ground at the opposite sides of a weed, and, at the same time, the handle portion 25 can be drawn toward the handle 12, by the fingers of the hand grasping said handle, thereby raising the rod 23 and causing the plate 21 to swing the jaws 14 together, as seen in Fig. 4. Then, by giving the shank a twisting or turning movement, the weed is loosened from the ground and can be pulled or extracted from the ground by keeping the jaws in closed position. By letting go of the handle portion 25, the spring 27 slides the rod 23 downwardly in the shank, to open the jaws, thereby letting the weed drop out.

Having thus described the invention, what is claimed as new is:—

1. An extractor comprising a shank, a pair of superposed plates secured to the shank, jaws having their upper ends abutting the upper plate and having hinge portions, the lower plate having portions receiving said hinge portions and holding them between the plates, and operating means connected to the jaws.

2. An extractor comprising a shank, a pair of plates secured to the shank, jaws abutting one of said plates and having hinge portions adjacent to said plate, the other plate having curved fingers receiving and holding said hinge portions between said fingers and firstnamed plate, and operating means connected to the jaws.

3. An extractor comprising a shank, a pair of plates secured to the shank, jaws having ends abutting one plate and having notches in their side edges adjacent to said plate forming hinge portions, the other plate having curved fingers engaging in said notches and receiving and holding said hinge portions, and operating means connected to said jaws.

4. An extractor comprising a tubular shank, a pair of plates, one of the plates being fitted on the end of the shank and the other plate abutting the end of the shank, to secure the plates to the shank, jaws having hinge portions, said plates having portions receiving and holding said hinge portions between them, and operating means connected to the jaws and including a rod slidable in said shank and secondnamed plate.

In testimony whereof I hereunto affix my signature.

WALTER C. MOORS.